United States Patent
Kim et al.

(10) Patent No.: US 12,340,040 B2
(45) Date of Patent: Jun. 24, 2025

(54) SENSOR DRIVING CIRCUIT AND DISPLAY APPARATUS INCLUDING THE SAME

(71) Applicant: LG Display Co., Ltd., Seoul (KR)

(72) Inventors: Seunghyeon Kim, Paju-si (KR); JunSeok Oh, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/405,542

(22) Filed: Jan. 5, 2024

(65) Prior Publication Data

US 2024/0256071 A1 Aug. 1, 2024

(30) Foreign Application Priority Data

Jan. 31, 2023 (KR) .................. 10-2023-0012910

(51) Int. Cl.
*G06F 3/041* (2006.01)
(52) U.S. Cl.
CPC .......... *G06F 3/0414* (2013.01); *G06F 3/0412* (2013.01); *G06F 3/0416* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 2018/0039319 A1* | 2/2018 | Brillant | G06F 3/044 |
| 2019/0250752 A1* | 8/2019 | Shim | G06F 3/0414 |
| 2024/0345688 A1* | 10/2024 | Oshita | G01V 3/08 |

* cited by examiner

*Primary Examiner* — Joseph R Haley
(74) *Attorney, Agent, or Firm* — Morgan, Lewis & Bockius LLP

(57) ABSTRACT

A sensor driving circuit includes a sensing channel connected with at least one sensor, a sensor monitoring part configured to receive a sensing signal from the sensing channel and generate a sensing start signal based on the sensing signal, and a sensing part sampling the sensing signal to obtain sensing data based on the sensing start signal.

21 Claims, 8 Drawing Sheets

SENSOR DRIVING CIRCUIT AND DISPLAY APPARATUS INCLUDING THE SAME

CROSS-REFERENCE TO RELATED APPLICATIONS

This application claims priority to and benefit of Korean Patent Application No. 10-2023-0012910 filed in the Republic of Korea on Jan. 31, 2023, the entire contents of which is hereby expressly incorporated by reference into the present application for all purposes, as if fully set forth herein.

BACKGROUND

Technical Field

The present disclosure relates to a sensor driving circuit and a display apparatus including the same.

Discussion of the Related Art

As the information-oriented society advances, the demands for display apparatuses for displaying an image are variously increasing.

Electronic devices which use a display apparatus as a display screen provide a user interface of a touch screen type, for the convenience of a user input. Display apparatuses capable of touch interface processing have advanced to provide various functions.

SUMMARY

Display apparatuses capable of touch interface processing essentially include one or more sensors. In such sensors, it is needed to continuously maintain an operation of a sensor, for non-temporary touch sensing, and due to this, there is a limitation where the power consumption of display apparatuses increases.

Accordingly, aspects of the present disclosure are directed to a sensor driving circuit and a display apparatus including the same that substantially obviate one or more of the problems due to limitations and disadvantages of the related art.

An aspect of the present disclosure is to provide a sensor driving circuit and a display apparatus including the same, which may efficiently decrease the load and power consumption of a processor caused by sensor driving and may reduce a sensing error caused by environment noise.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a sensor driving circuit aspect may comprise a sensing channel connected with at least one sensor, a sensor monitoring part configured to receive a sensing signal from the sensing channel and generate a sensing start signal based on the sensing signal, and a sensing part sampling the sensing signal to obtain a sensing data based on the sensing start signal.

In another aspect, a display apparatus may comprise a display panel configured to display an image and a force sensor part configured to sense a pressure of the display panel. The force sensor part includes a sensing channel connected with at least one sensor, a sensor monitoring part configured to receive a sensing signal from the sensing channel and generate a sensing start signal based on the sensing signal, and a sensing part sampling the sensing signal to obtain a sensing data based on the sensing start signal.

According to one or more aspects of the present disclosure, a sensor driving circuit and a display apparatus including the same, which may efficiently decrease the load and power consumption of a processor caused by sensor driving and may reduce a sensing error caused by environment noise, may be provided.

According to one or more aspects of the present disclosure, the load and power consumption of a processor caused by sensor driving may be efficiently reduced, and thus, a sensor driving circuit and a display apparatus including the same, where low power may be implemented or realized, may be provided.

It is to be understood that both the foregoing general description and the following description are exemplary and explanatory and intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain principles of the disclosure.

Figure 1:
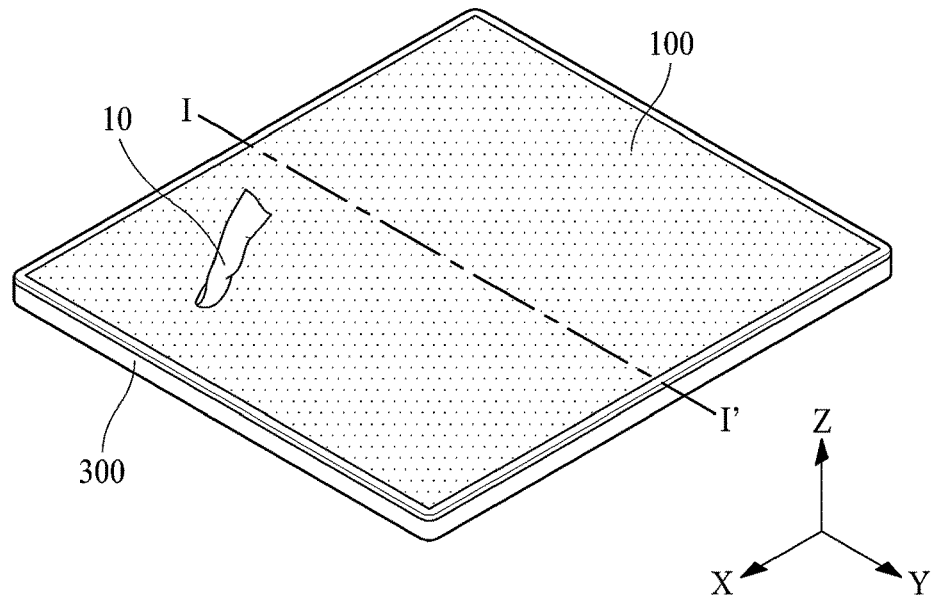
FIG. 1 is a perspective view illustrating a display apparatus according to an aspect of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof can be exaggerated for clarity, illustration, and/or convenience.

DETAILED DESCRIPTION

Reference is now made in detail to aspects of the present disclosure, examples of which can be illustrated in the accompanying drawings. In the following description, when a detailed description of well-known functions, structures or configurations can unnecessarily obscure aspects of the present disclosure, the detailed description thereof may have been omitted for brevity. Further, repetitive descriptions may be omitted for brevity. The progression of processing steps and/or operations described is an example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the aspects described with reference to the accompanying drawings. The present disclosure can, however, be embodied in different forms and should not be construed as limited to the aspects set forth herein. Rather, these aspects are examples and are provided so that this disclosure can be thorough and complete, to assist those skilled in the art to understand the inventive concepts without limiting the protected scope of the present disclosure.

Shapes (e.g., sizes, lengths, widths, heights, thicknesses, locations, radii, diameters, and areas), sizes, ratios, angles, numbers, and the like disclosed herein, including those illustrated in the drawings are merely examples, and thus, the present disclosure is not limited to the illustrated details. Any implementation described herein as an "example" is not necessarily to be construed as preferred or advantageous over other implementations. It is, however, noted that the relative dimensions of the components illustrated in the drawings are part of the present disclosure.

When the term "comprise," "have," "include," "contain," "constitute," "made of," "formed of," or the like is used with respect to one or more elements, one or more other elements may be added unless a term such as "only" or the like is used. The terms used in the present disclosure are merely used in order to describe example aspects, and are not intended to limit the scope of the present disclosure. The terms of a singular form may include plural forms unless the context clearly indicates otherwise.

The word "exemplary" is used to mean serving as an example or illustration. Aspects are example aspects. "Aspects," "examples," "aspects," and the like should not be construed as preferred or advantageous over other implementations. An aspect, an example, an example aspect, an aspect, or the like may refer to one or more aspects, one or more examples, one or more example aspects, one or more aspects, or the like, unless stated otherwise. Further, the term "may" encompasses all the meanings of the term "can."

In one or more aspects, unless explicitly stated otherwise, element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more parts may be located between two other parts unless a more limiting term, such as "immediate(ly)," "direct(ly)," or "close(ly)," is used. For example, when a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as "after," "subsequent," "next," "before," "preceding," "prior to," or the like a case which is not consecutive or not sequential may be included and thus one or more other events may occur therebetween, unless a more limiting term, such as "just," "immediate(ly)," or "direct (ly)" is used.

The terms, such as "below," "lower," "above," "upper" and the like, may be used herein to describe a relationship between element(s) as illustrated in the drawings. It will be understood that the terms are spatially relative and based on the orientation depicted in the drawings.

It is understood that, although the terms "first", "second," or the like may be used herein to describe various elements (e.g., layers, films, regions, components, sections, or the like), these elements should not be limited by these terms, for example, to any particular order, sequence, precedence, or number of elements. These terms are used only to partition one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, or the like) is "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) is "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other, and may be meant as lines or directions having wider directivities within the range within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases of "at least one of a first item, a second item, or a third item" and "at least one of a first item, a second item, and a third item" may represent (i) a combination of items provided by two or more of the first item, the second item, and the third item or (ii) only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any of A, B, and C (e.g., A, B, or C); or some or some combination of A, B, and C (e.g., A and B; A and C; or B and C); or all of A, B, and C. Furthermore, an expression "A/B" may be understood as A and/or B. For example, an expression "A/B" can refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various aspects of the present disclosure may be partially or entirety coupled to or combined with each other, may be technically associated with each other, and may be variously inter-operated, linked or driven together. The aspects of the present disclosure may be implemented or carried out independently of each other, or may be implemented or carried out together in a co-dependent or related relationship. In one or more aspects, the components of each apparatus according to various aspects of the present disclosure are operatively coupled and configured.

Unless otherwise defined, the terms (including technical and scientific terms) used herein have the same meaning as commonly understood by one of ordinary skill in the art to which example aspects belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example aspects.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the present disclosure, examples of a "display apparatus" may include a display apparatus such as a display module including a display panel and a driver for driving the display panel. Also, examples of the display module may include a set device (or a set apparatus) or a set electronic device such as a notebook computer, a television (TV), a computer monitor, an equipment apparatus including an automotive apparatus or another type apparatus for vehicles, or a mobile electronic device such as a smartphone or an electronic pad, which is a complete product (or a final product) including a display module such as a liquid crystal display module or a light emitting display module (for example, an organic light emitting display module, a quantum dot light-emitting display panel, a micro light-emitting diode display panel, and an electrophoresis display panel, etc.).

Therefore, in the present disclosure, examples of a display apparatus may include a display apparatus itself, such as a liquid crystal display module or an organic light emitting display module, and a set device which is a final consumer device or an application product including a display apparatus such a liquid crystal display module or an organic light emitting display module, without being limited thereto.

A display panel used in one or more aspects of the present disclosure may use all types of display panels such as a liquid crystal display panel, an organic light emitting display panel, a mini light emitting diode display panel, and a micro light emitting diode display panel, but aspects of the present disclosure are not limited thereto. For example, a display panel may be a display panel which may sense a touch or pressure (or force) of a user by using a sensor driving circuit according to an aspect of the present disclosure. Also, a shape or a size of a display panel applied to a display apparatus according to an aspect of the present aspect is not limited.

According to one or more aspects of the present disclosure, when a display panel is a liquid crystal display panel, the display panel may include a plurality of gate lines, a plurality of data lines, and a plurality of pixels provided in a plurality of pixel areas defined by intersections of the plurality of gate lines and the plurality of data lines. Also, the display panel may include a first substrate including a thin film transistor (TFT) which is a switching element for adjusting a light transmittance in each of the plurality of pixels, a second substrate including a color filter and/or a black matrix, and a liquid crystal layer between the first substrate and the second substrate, without being limited thereto.

When a display panel is an organic light emitting display panel, the display panel may include a plurality of gate lines, a plurality of data lines, and a plurality of pixels respectively provided in a plurality of pixel areas defined by intersections of the plurality of gate lines and the plurality of data lines. Also, the display panel may include a substrate including a TFT which is an element for selectively applying a voltage to each of the pixels, an organic light emitting device layer on the substrate, and an encapsulation layer (or an encapsulation substrate) disposed on the substrate to cover the organic light emitting device layer, without being limited thereto. The encapsulation substrate may protect the TFT and the organic light emitting device layer from an external impact and may prevent or reduce water or oxygen from penetrating into the organic light emitting device layer. Also, the organic light emitting device layer may include an inorganic light emitting layer (for example, a nano-sized material layer and/or a quantum dot emission layer), without being limited thereto. As another example, the organic light emitting device layer may be replaced with a micro light emitting diode or a mini light emitting diode, without being limited thereto.

In present disclosure, as an example, a display apparatus including a vibration apparatus may be implemented as a user interface device such as a central control panel in automobiles, and thus, may be applied to vehicles.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

In the following description, various example aspects of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, aspects of the present disclosure are not limited to a scale, dimension, size, and thickness illustrated in the drawings.

Figure 2:
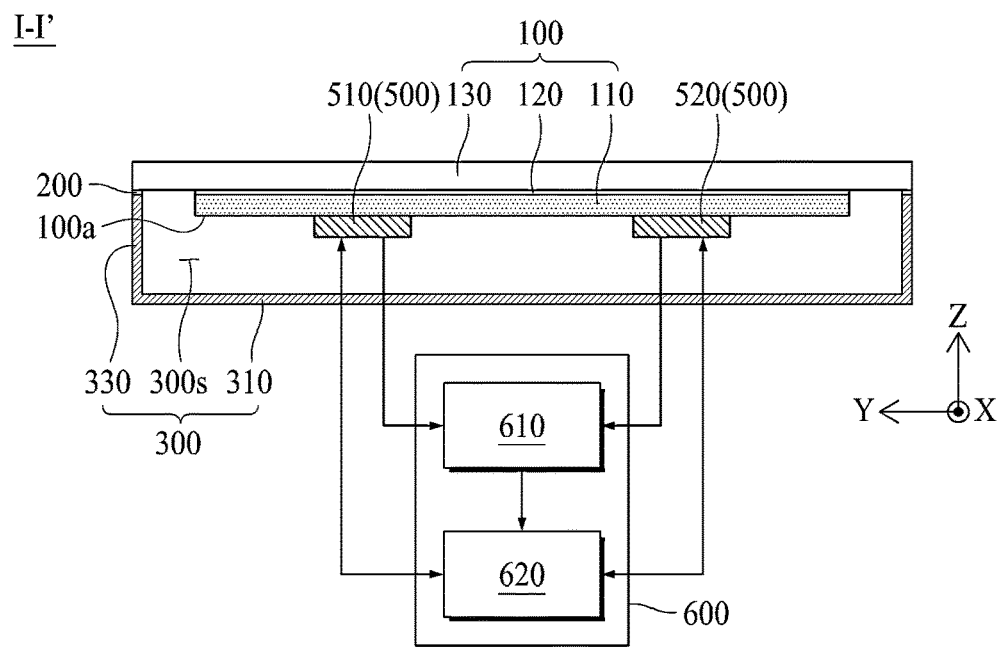
FIG. 2 is a cross-sectional view taken along line I-I' illustrated in FIG. 1 according to an aspect of the present disclosure.

FIG. 1 is a perspective view illustrating a display apparatus according to an aspect of the present disclosure. FIG. 2 is a cross-sectional view taken along line I-I' illustrated in FIG. 1 according to an aspect of the present disclosure.

Referring to FIGS. 1 and 2, the display apparatus according to an aspect of the present disclosure may be configured to sense one or more of a finger touch based on a finger 10, a touch based on a touch pen (or a stylus pen) and a touch based on an object other than the finger or the touch pen. For example, the display apparatus according to an aspect of the present disclosure may be a display apparatus to which a touch panel is added or a display apparatus with a touch screen integrated therein. For example, the display apparatus according to an aspect of the present disclosure may be used as a mobile electronic device, such as a mobile phone, a smartphone, a smart watch, a tablet personal computer (PC), or a watch phone, or a display apparatus such as a smart TV, an electronic bulletin board, a bidirectional information transfer transparent display, a bidirectional digital signage, a notebook computer, a monitor, or a refrigerator, but aspects of the present disclosure are not limited thereto.

The display apparatus according to an aspect of the present disclosure may include a display member 100 and a sensor driving circuit 600.

The display member 100 may be configured to display an image and may provide a user interface which senses a touch or pressure (or force) of, for example, a user to recognize a user input.

For example, the display member 100 may include a display panel 110, a touch panel 120, and one or more sensors 500. However, aspects of the present disclosure are not limited thereto.

The display panel 110 may be configured to display an image. For example, the display panel 110 may include a plurality of pixels which are configured to display an image. The image may include an electronic image, a digital image, a still image, or a video image. For example, the display panel 110 may include an organic light emitting display panel including a plurality of pixels displaying a black or color image, but the kind of display panel is not limited thereto. For example, the display panel 110 may include a liquid crystal display panel, an electrophoresis display panel, a micro light emitting diode display panel, a mini light emitting diode display panel, an electro-wetting display panel, or a quantum dot light emitting display panel. Hereinafter, an example where the display panel 110 is an organic light emitting display panel will be described, but aspects of the present disclosure are not limited thereto.

As an example, the organic light emitting display panel may include a base substrate, a display part, and a plate member.

The base substrate may include one or more of a glass material and a plastic material, but aspects of the present disclosure are not limited thereto. As an example, the base substrate may also include metal, semiconductor, or other inorganic materials such as ceramics. The display part may include a pixel array part including a plurality of pixels provided in a plurality of pixel areas defined by a plurality of gate lines and/or a plurality of data lines. Each of the plurality of pixels may include an organic emission layer. The plate member may be configured to cover the display part. The plate member may be attached on the display part by an adhesive member, a fixing member or a magnetic force, without being limited thereto. The plate member may protect the display part or the display panel from an external impact and may prevent or reduce external water or moisture from penetrating into the light emitting device layer.

The display panel 110 according to an aspect of the present disclosure may further include an encapsulation layer. The encapsulation layer may be configured between the display part and the plate member to directly surround the display portion. The encapsulation layer may be configured to prevent external water or moisture from penetrating into the light emitting device layer. The encapsulation layer may be provided as an inorganic material layer or an organic material layer, or may be formed in a structure where an inorganic material layer and an organic material layer are alternately stacked, but aspects of the present disclosure are not limited thereto. For example, the encapsulation layer may be omitted based on a structure of the display panel.

The touch panel (or a touch screen) 120 may be configured to sense a user touch applied to the display member 100. For example, the touch panel 120 may be configured to sense a user touch based on the touch pen, the finger 10 or other objects. The touch panel 120 may be configured to be connected with the display panel 110. For example, the display panel 110 may be an organic light emitting display panel with a touch screen integrated therein.

The touch panel 120 according to an aspect of the present disclosure may be configured to cover a front surface of the display panel 110. For example, the touch panel 120 may be disposed to cover a front surface of the plate member or a front surface of the base substrate of the display panel 110.

According to another aspect of the present disclosure, the touch panel 120 may be provided between the display portion and the plate member of the display panel 110, but aspects of the present disclosure are not limited thereto. For example, the touch panel 120 may be disposed in the pixel array portion of the display panel 110, and in this case, the touch panel 120 may be an in-cell touch panel, a touch electrode layer, or a touch sensor layer, but aspects of the present disclosure are not limited thereto. For example, the touch panel 120 may include an electrode structure corresponding to a mutual-capacitance type, which is configured so that a plurality of touch driving electrodes intersect with a plurality of touch sensing electrodes, or a self-capacitance type which is configured with only a plurality of touch sensing electrodes.

According to an aspect of the present disclosure, the touch panel 120 of the display member 100 may be omitted. In this case, the display apparatus may be configured to sense a touch or pressure (or force) of a user by using the one or more sensors 500. For example, when the touch panel 120 is omitted, the one or more sensors 500 may be configured to sense a touch or pressure (or force) of a user instead of a function of the touch panel 120.

The one or more sensors 500 may be provided at a rear surface of the display member 100. For example, the one or more sensors 500 may be configured to sense a user touch applied to the display member 100. For example, the one or more sensors 500 may include a force sensor for sensing pressure (or force) based on the user touch. For example, the force sensor may be configured or implemented as at least one of a piezoelectric type, a force sensing resistor (FSR) type, or a strain gauge type, but aspects of the present disclosure are not limited thereto. The one or more sensors 500 may output a sensing signal, based on the pressure (or force) based on the user touch. For example, the sensing signal may be a voltage signal. The one or more sensors 500 may be connected with the display member 100. For example, the one or more sensors 500 may be connected with a rear surface 100a of the display panel 110. However, aspects of the present disclosure are not limited thereto.

As illustrated in FIG. 2, the one or more sensors 500 may include a plurality of sensors 510 and 520. For example, the plurality of sensors 510 and 520 may include a first sensor 510 and a second sensor 520. The rear surface 100a of the display member 100 or the display panel 110 may be divided into a plurality of regions, and the first sensor 510 and the second sensor 520 may be disposed in each of the plurality of regions. For example, the display member 100 or the display panel 110 may be divided into a left region (or a first region) and a right region (or a second region) with respect to a first direction Y (or a horizontal direction), but aspects of the present disclosure are not limited thereto. The first sensor 510 may be disposed in the left region, and the second sensor 520 may be disposed in the right region, but aspects of the present disclosure are not limited thereto. The number and position of the one or more sensors 500 may be variously changed. The sensing driving of the one or more sensors 500 may be controlled by the sensor driving circuit 600.

The sensor driving circuit 600 according to an aspect of the present disclosure may be electrically connected with the one or more sensors 500 through a sensing channel, may receive a sensing signal from the one or more sensors 500, may generate the sensing start signal on the basis of the received sensing signal, may sample the sensing signal received from the one or more sensors 500 on the basis of the sensing start signal to obtain sensing data, and may sense a touch input or pressure (or force) of a user by the obtained sensing data.

The sensor driving circuit 600 may include a sensor monitoring part 610 and a sensing part 620, but aspects of the present disclosure are not limited thereto.

For example, the sensor monitoring part 610 may generate the sensing start signal, based on the sensing signal received from the one or more sensors 500. For example, the sensing part 620 may sample the sensing signal to obtain sensing data, based on the sensing start signal.

The sensor monitoring part 610 may generate the sensing start signal, based on the amount of variation of the sensing signal received from the one or more sensors 500. For example, the sensor monitoring part 610 may monitor the amount of variation of the sensing signal, based on a first sensing signal received in real time and a second sensing signal which is received prior to the first sensing signal and is delayed, and when the amount of variation of the sensing signal is greater than or equal to a threshold value, the sensor monitoring part 610 may generate the sensing start signal. However, aspects of the present disclosure are not limited thereto.

For example, the amount of variation of the sensing signal may denote the amount of momentary variation where a current-time sensing signal and a previous-time sensing signal vary momentarily, but aspects of the present disclosure are not limited thereto. For example, the sensor monitoring part 610 may generate the sensing start signal, based on the amount of momentary variation of the sensing signal received from the one or more sensors 500. For example, the sensor monitoring part 610 may monitor the amount of momentary variation of the sensing signal, based on the first sensing signal received in real time and the second sensing signal which is received prior to the first sensing signal and is delayed, and when the amount of variation of the sensing signal is greater than or equal to the threshold value, the sensor monitoring part 610 may generate the sensing start signal. For example, the sensor monitoring part 610 may sense the amount of variation of the sensing signal received in real time, and thus, the amount of variation of the sensing signal may be the amount of momentary variation. Aspects are not limited thereto. As an example, the amount of variation of the sensing signal may also denote an amount of variation where a current-time sensing signal and a previous-time sensing signal vary during a period, without being limited thereto.

The sensing part 620 may activate an operation of sampling the sensing signal according to the sensing start signal. For example, the sensing part 620 may operate in a low power mode which stops a sampling operation on the sensing signal while the sensing start signal is not applied thereto. When the sensing start signal is applied, the sensing part 620 may start the sampling operation of the sensing signal in synchronization with the sensing start signal and may operate in a sensing mode of sampling the sensing signal to obtain the sensing data.

According to an aspect of the present disclosure, the sensor driving circuit 600 may not continuously maintain the sampling operation on the sensing signal so as to sense a non-temporary touch or pressure (or force) of a user and may perform control so that the sampling operation on the sensing signal is performed at only a time at which the touch or pressure (or force) of the user is input, and thus, the load and power consumption of a processor may be efficiently reduced.

The display member 100 according to an aspect of the present disclosure may further include a front member 130 which is at a front surface of the display panel 110.

The front member 130 may configure a foremost structure material with respect to the display apparatus and may protect a screen of the display panel 110. The front member 130 may be disposed at the front surface of the display panel 110. For example, the front member 130 may cover the front surface (or the screen) of the display panel 110, and thus, may protect the display panel 110 and the touch panel 120 from an external impact. For example, the front member 130 may be disposed at the front surface of the touch panel 120. For example, the touch panel 120 may be disposed between the front member 130 and the display panel 110. For example, the touch panel 120 may be connected with or attached on a rear surface of the front member 130.

The front member 130 according to an aspect of the present disclosure may include a transparent material. As an example, the front member 130 according to an exemplary aspect of the present disclosure may include a transparent plastic material, a glass material, or a tempered glass material, but aspects of the present disclosure are not limited thereto. For example, the front member 130 may be a front structure material, a front window, a cover window, a glass window, a cover screen, a screen cover, or window glass, but aspects of the present disclosure are not limited to the terms.

The display apparatus according to an aspect of the present disclosure may further include a supporting member 300. The supporting member 300 may be configured or disposed at the rear surface 100a of the display member 100 or the display panel 110. The supporting member 300 may be configured to cover or surround the rear surface 100a of the display member 100 or the display panel 110. Aspects are not limited thereto. As an example, the supporting member 300 may be configured to expose a portion of the rear surface 100a of the display member 100 or the display panel 110.

The supporting member 300 may include an internal space 300s which covers the rear surface 100a of the display member 100 or the display panel 110. For example, the supporting member 300 may include a box shape. For example, the supporting member 300 may include a box shape where at least one side (or an upper side) of the internal space 300s is opened.

The supporting member 300 according to an aspect of the present disclosure may include a first supporting portion 310 and a second supporting portion 330.

The first supporting portion 310 may be configured or disposed at the rear surface 100a of the display member 100. For example, the first supporting portion 310 may be configured to cover the rear surface 100a of the display member 100. For example, the first supporting portion 310 may be configured to entirely or partially cover the rear surface 100a of the display panel 110. The first supporting portion 310 may be spaced apart from the rear surface 100a of the display member 100 or the display panel 110. For example, the first supporting portion 310 may be spaced apart from the rear surface 100a of the display member 100 or the display panel 110 with the internal space 300s therebetween. For example, the first supporting portion 310 may be a bottom portion, a bottom plate, a supporting plate, a housing plate, or a housing bottom portion, the aspects of the present disclosure are not limited thereto.

The second supporting portion 330 may be configured or disposed at an edge of the display member 100, without being limited thereto. For example, the second supporting portion 330 may be configured or disposed at an edge of the rear surface 100a of the display member 100. For example, the second supporting portion 330 may be connected with an edge portion of the first supporting portion 310. For example, the second supporting portion 330 may include a structure where the edge portion of the first supporting portion 310 is bent. For example, the second supporting portion 330 may be a lateral portion, a sidewall, a supporting sidewall, a housing lateral surface, or a housing sidewall, the aspects of the present disclosure are not limited thereto.

The second supporting portion 330 may be provided as one body with the first supporting portion 310. For example, the first supporting portion 310 and the second supporting portion 330 may be provided as one body, and thus, the internal space 300s surrounded by the second supporting portion 330 may be provided on the first supporting portion 310. Accordingly, the supporting member 300 may include a box shape where one side (or an upper side) is opened by the first supporting portion 310 and the second supporting portion 330.

The display apparatus according to an aspect of the present disclosure may further include a coupling member 200 between the display member 100 and the supporting member 300.

The supporting member 300 may be coupled to or connected with the display member 100 by the coupling member 200. The supporting member 300 may be connected with or coupled to the display member 100 by using the coupling member 200. The supporting member 300 may be connected with or coupled to a rear edge portion of the display member 100 by using the coupling member 200. For example, the supporting member 300 may be connected with or coupled to a rear edge portion of the front member 130 by using the coupling member 200 and may surround a lateral surface of each of the touch panel 120 and the display panel 110. Aspects are not limited thereto. As an example, the supporting member 300 may be connected with or coupled to a rear edge portion of the display panel 110 by using the coupling member 200 and may surround a lateral surface of the at least one sensor 500.

According to an aspect of the present disclosure, the front member 130 of the display member 100 may be omitted. In this case, the coupling member 200 may be provided between the display panel 110 and the supporting member 300. For example, when the front member 130 is omitted, the coupling member 200 may be disposed between the rear edge portion of the display panel 110 and a front edge portion of the first supporting portion 310.

Figure 3:
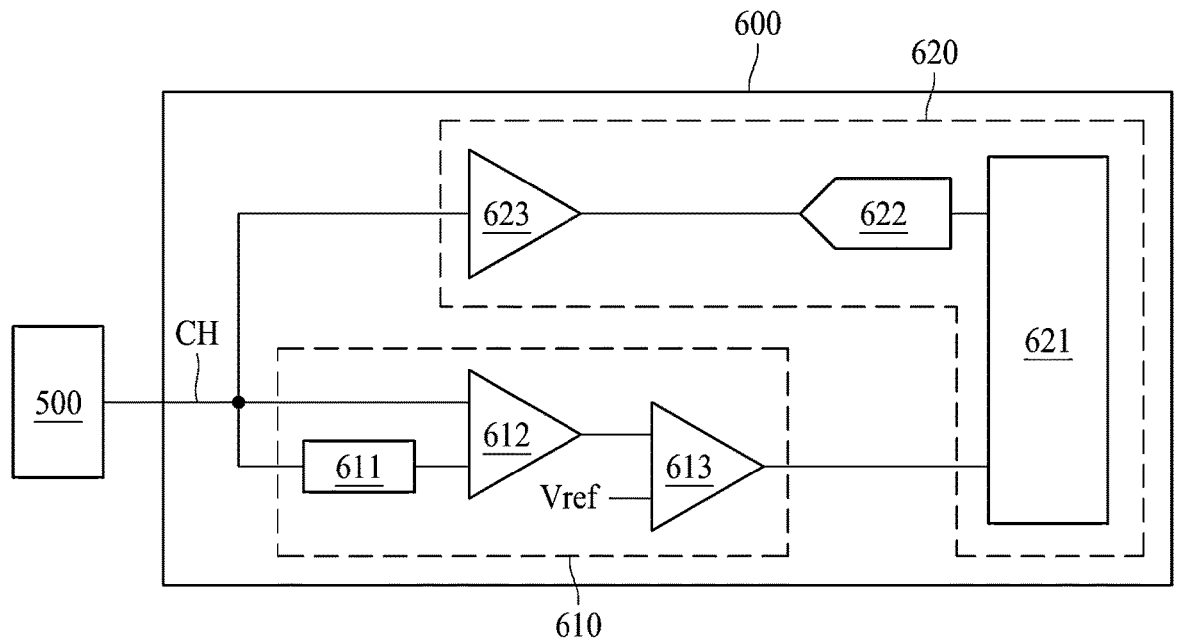
FIG. 3 illustrates a sensor driving circuit according to an aspect of the present disclosure.
Figure 4:
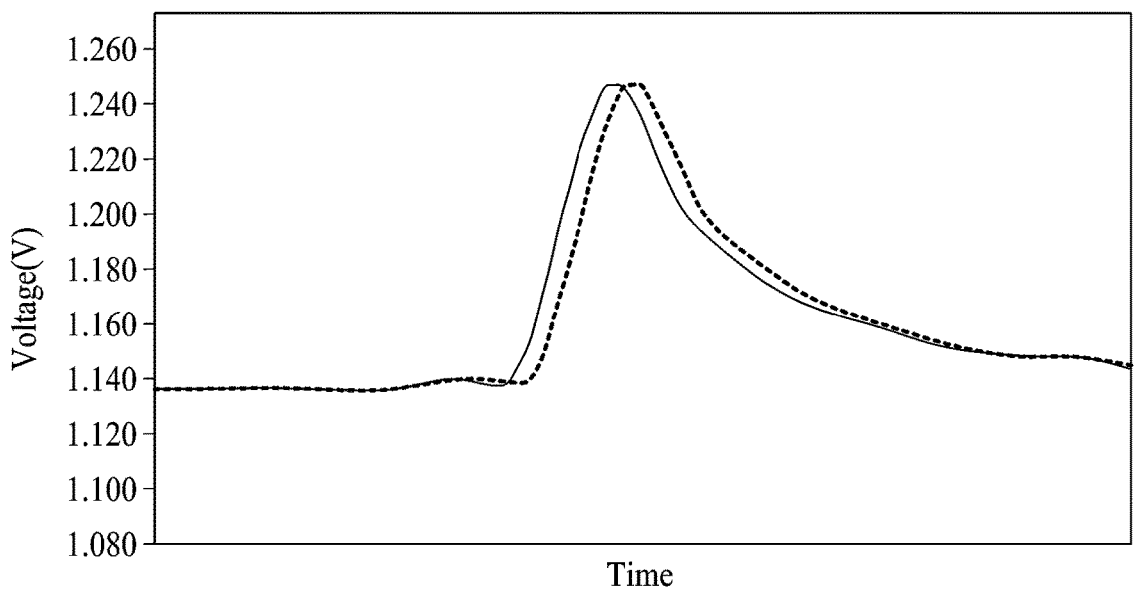
FIG. 4 illustrates a sensing signal applied to the sensor driving circuit illustrated in FIG. 3 according to an aspect of the present disclosure.
Figure 5:
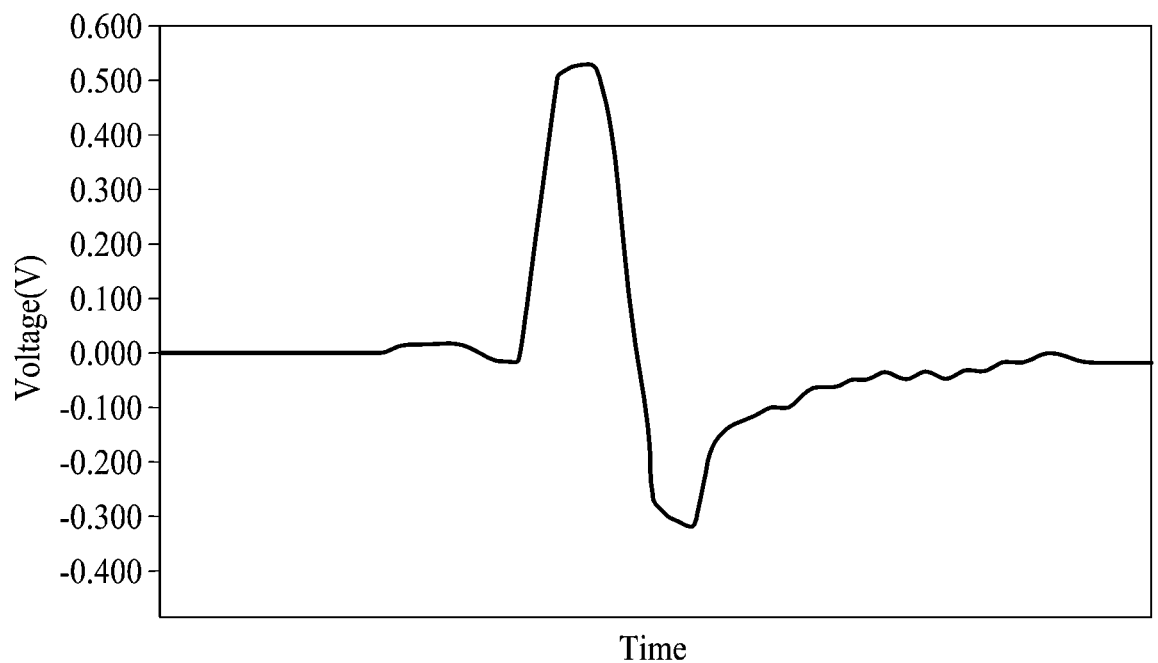
FIG. 5 illustrates the amount of variation of a sensing signal output from the sensor driving circuit illustrated in FIG. 3 according to an aspect of the present disclosure.
Figure 6:
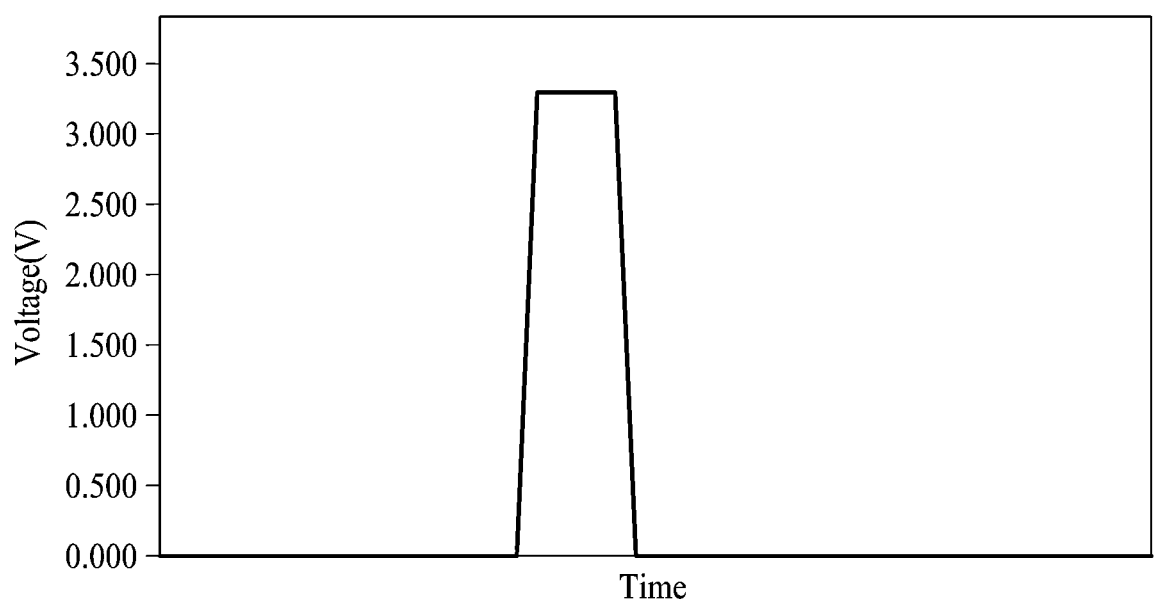
FIG. 6 illustrates a sensing start signal output from the sensor driving circuit illustrated in FIG. 3 according to an aspect of the present disclosure.
Figure 7:
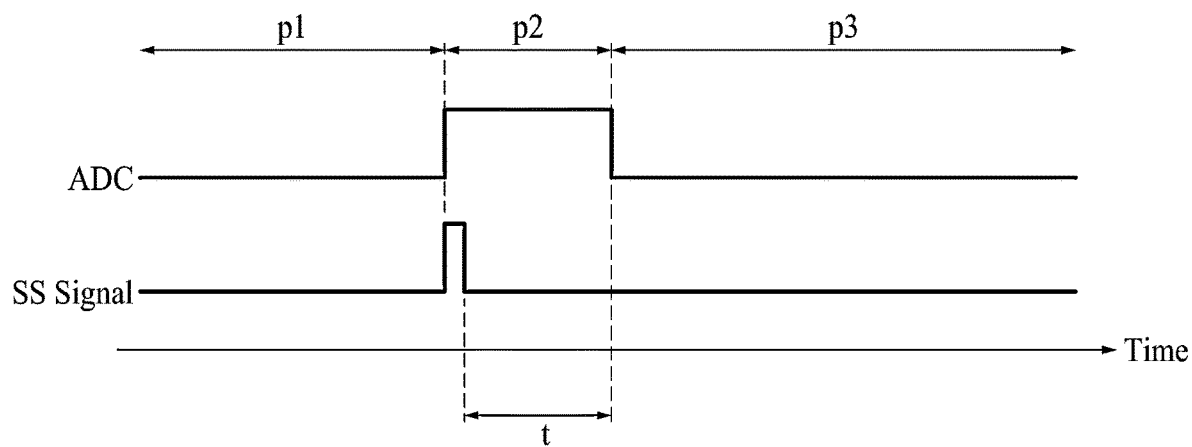
FIG. 7 illustrates for describing a sensing operation of a sensor driving circuit according to an aspect of the present disclosure.
Figure 8:
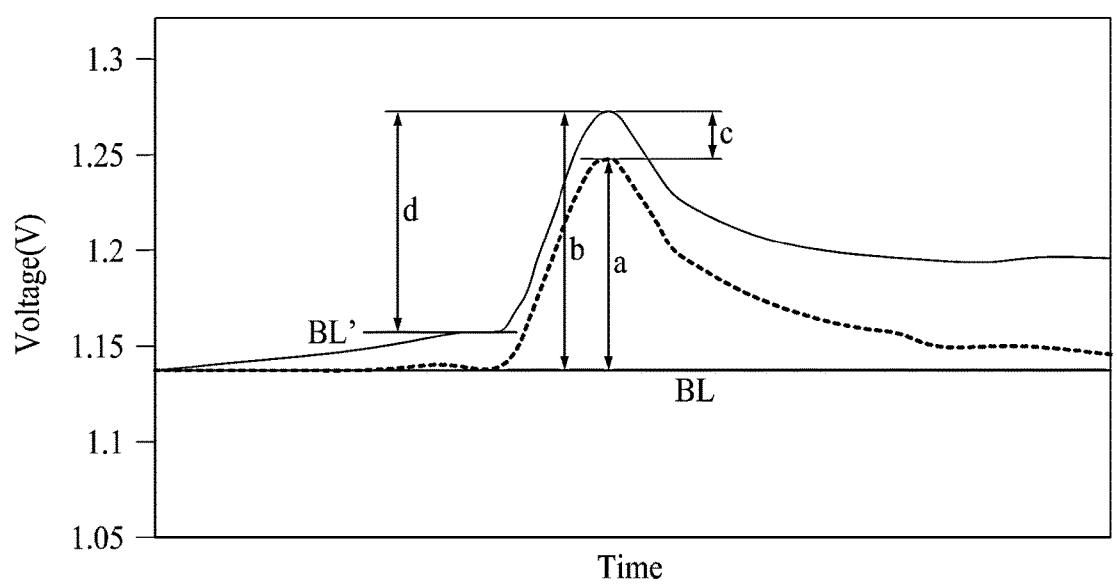
FIG. 8 illustrates for describing a sensing operation of a sensor driving circuit according to an aspect of the present disclosure.

FIG. 3 illustrates a sensor driving circuit according to an aspect of the present disclosure. FIG. 4 illustrates a sensing signal applied to the sensor driving circuit illustrated in FIG. 3 according to an aspect of the present disclosure. FIG. 5 illustrates the amount of variation of a sensing signal output from the sensor driving circuit illustrated in FIG. 3 according to an aspect of the present disclosure. FIG. 6 illustrates a sensing start signal output from the sensor driving circuit illustrated in FIG. 3 according to an aspect of the present disclosure. FIG. 7 illustrates for describing a sensing operation of a sensor driving circuit according to an aspect of the present disclosure. FIG. 8 illustrates for describing a sensing operation of a sensor driving circuit according to an aspect of the present disclosure.

Referring to FIGS. 3 to 8, a sensor driving circuit 600 according to an aspect of the present disclosure may include a sensor monitoring part 610 and a sensing part 620.

The sensor monitoring part 610 may be connected with a sensing channel CH including at least one sensor 500. The sensor monitoring part 610 may receive a sensing signal of the at least one sensor 500 through the sensing channel CH. The sensor monitoring part 610 may generate a sensing start signal, based on the received sensing signal. For example, the sensing start signal may be a trigger signal which allows the sensing part 620 to start a sampling operation on the sensing signal.

The sensing part 620 may sample the sensing signal according to the sensing start signal to obtain sensing data. For example, the sensing part 620 may sense a touch or pressure (or force) of a user by the sensing data.

The sensor monitoring part 610 may include a signal delay filter 611, a first amplifier 612, and a second amplifier 613, but aspects of the present disclosure are not limited thereto.

The signal delay filter 611 may be configured to be connected with the sensing channel CH. The signal delay filter 611 may receive the sensing signal through the sensing channel CH connected with the at least one sensor 500. The signal delay filter 611 may output a delay signal corresponding to the sensing signal. For example, the signal delay filter 611 may delay an output of the received sensing signal, or may delay a phase of the received sensing signal.

The first amplifier 612 may be configured to be connected with the sensing channel CH and the signal delay filter 611. The first amplifier 612 may include a first terminal, a second terminal, and an output terminal. For example, the first terminal may be an inverting terminal, and the second terminal may be a noninverting terminal. The sensing channel CH may be connected with the first terminal of the first amplifier 612. The signal delay filter 611 may be connected with the second terminal of the first amplifier 612. But aspects of the present disclosure are not limited thereto.

The first amplifier 612 may output, through the output terminal, the amount of variation or momentary variation of the sensing signal generated by the at least one sensor 500, based on a first sensing signal directly applied through the sensing channel CH and a second sensing signal received prior to the first sensing signal via the signal delay filter 611, but aspects of the present disclosure are not limited thereto.

The second amplifier 613 may be configured to be connected with the first amplifier 612 and a reference voltage Vref. The second amplifier 613 may include a first terminal, a second terminal, and an output terminal. For example, the first terminal may be a noninverting terminal, and the second terminal may be a reference voltage input terminal. The first terminal of the second amplifier 613 may be connected with the output terminal of the first amplifier 612. The reference voltage Vref may be connected with the second terminal of the second amplifier 613. But aspects of the present disclosure are not limited thereto.

The second amplifier 613 may compare the reference voltage Vref with the amount of variation or momentary variation of the sensing signal output from the first amplifier 612 and may output a voltage signal, which is greater than the reference voltage Vref, through the output terminal. The voltage signal output from the second amplifier 613 may be the sensing start signal. But aspects of the present disclosure are not limited thereto.

As illustrated in FIG. 4, the first amplifier 612 may receive a first sensing signal (a solid line) and a second sensing signal (a dotted line). For example, the first sensing signal (the solid line) may be a real time signal directly received through the sensing channel CH, and the second sensing signal (the dotted line) may be a delay signal which is received prior to the first sensing signal via the signal delay filter 611. For example, the first sensing signal (the solid line) and the second sensing signal (the dotted line) may be a voltage signal which increases based on a touch or pressure (or force) of a user. For example, when the touch or pressure (or force) of the user is not sensed, the first sensing signal (the solid line) and the second sensing signal (the dotted line) may maintain a certain voltage value. As an example, the certain voltage value may be about 1.135 V, without being limited thereto. When the touch or pressure (or force) of the user is sensed, the first sensing signal (the solid line) and the second sensing signal (the dotted line) may increase. As an example, the first sensing signal (the solid line) and the second sensing signal (the dotted line) may increase by about 1.250 V. However, aspects of the present disclosure are not limited thereto.

As illustrated in FIG. 5, the first amplifier 612 may output the amount of variation or momentary variation determined based on comparison of the first sensing signal and the second sensing signal. For example, the first amplifier 612 may be a subtraction amplifier which subtracts the second sensing signal from the first sensing signal to output an amplified signal, without being limited thereto. As an example, the first amplifier 612 may be a subtraction amplifier which subtracts the first sensing signal from the second sensing signal to output an amplified signal, without being limited thereto. When the touch or pressure (or force) of the user is not sensed, the amount of variation or momentary variation of the sensing signal output from the first amplifier 612 may maintain a certain voltage value of about 0 V. When the touch or pressure (or force) of the user is sensed, the amount of variation or momentary variation of the sensing signal output from the first amplifier 612 may have a signal width equal to a time for which the second sensing signal is delayed from the first sensing signal, and an increased voltage value (e.g., a voltage value increasing up to, for example, 0.540 V) may be output. However, aspects of the present disclosure are not limited thereto.

As illustrated in FIG. 6, when the amount of variation or momentary variation of the sensing signal output from the first amplifier 612 is greater than a threshold value defined by the reference voltage Vref, the second amplifier 613 may output a voltage pulse signal having a first voltage level (e.g., a high level, without being limited thereto). For example, the second amplifier 613 may be a comparison amplifier which compares the reference voltage Vref with a voltage signal output from the first amplifier 612. For example, when the reference voltage Vref is adjust to 0.25 V and the voltage signal output from the first amplifier 612 is greater than 0.25 V, a voltage value output from the second amplifier 613 may be adjusted to 3.3 V, but aspects of the present disclosure are not limited thereto. The voltage signal output from the second amplifier 613 may be transferred to the sensing part 620. For example, the voltage signal output from the second amplifier 613 may be a sensing start signal which triggers a sampling operation of the sensing part 620.

Referring to FIG. 3, the sensing part 620 may include a sensing controller 621, an analog-to-digital converter (ADC) 622, and a signal amplifier 623, but aspects of the present disclosure are not limited thereto.

The sensing controller 621 may be configured to control an operation of the ADC 622, based on the sensing start signal applied from the sensor monitoring part 610. The sensing controller 621 may start or stop an operation of the ADC 622, based on the sensing start signal. For example, when the sensing start signal is applied, the sensing controller 621 may start an operation of the ADC 622. For example, when the sensing start signal is applied and a certain time elapses, the sensing controller 621 may stop the operation of the ADC 622.

The ADC 622 may be configured to be connected with the sensing channel CH. Based on control by the sensing controller 621, the ADC 622 may convert an analog sensing signal, received through the sensing channel CH, into digital sensing data and may transfer the digital sensing data to the sensing controller 621. For example, the ADC 622 may start or stop a sampling operation, based on control by the sensing controller 621.

The signal amplifier 623 may be connected between the sensing channel CH and the ADC 622. The signal amplifier 623 may amplify and output a voltage value of the sensing signal applied through the sensing channel CH. For example, the signal amplifier 623 may start or stop a signal amplification operation, based on control by the sensing controller 621.

As illustrated in FIG. 7, when a sensing start signal (SS Signal) is applied from the sensor monitoring part 610, the sensing controller 621 may start an operation of the ADC 622 in synchronization with the sensing start signal (SS Signal). For example, the sensing controller 621 may maintain a standby mode during a first period p1 before the sensing start signal (SS Signal) is received. The sensing controller 612 may stop an operation of ADC 622 during the first period p1.

When the sensing start signal (SS Signal) is received, the sensing controller 621 may start an operation of the ADC 622 in synchronization with the sensing start signal (SS Signal) and may sample a sensing signal applied through the sensing channel CH from the ADC 622 to obtain sensing data. A sampling period of the sensing signal may be maintained during a second period p2. For example, the sensing controller 621 may maintain a sampling operation of the ADC 622 for a certain time t from a time at which the sensing start signal (SS Signal) is applied, and when the certain time t elapses, the sensing controller 621 may stop an operation of the ADC 622 again. The sensing controller 621 may maintain the standby mode during a third period p3 after the second period p2. The sensing controller 612 may stop an operation of the ADC 622 during the third during p3. As an example, the certain time t may be variously set, within the capability of the ADC 622, without being limited thereto.

The sensing controller 621 may be configured to reduce, prevent or minimize the distortion (or error) of a sensing signal caused by environment noise. The sensing controller 621 may be configured to improve or enhance the accuracy of sensing data obtained through sampling by the ADC 622. For example, the sensing controller 621 may change a sampling reference value (or a base line) of the ADC 622. The sensing controller 621 may adjust the sampling reference value (or the base line) of the ADC 622 with respect to a time at which the sensing start signal is applied from the sensor monitoring part 610. But aspects of the present disclosure are not limited thereto.

As illustrated in FIG. 8, when the same or substantially the same touch or pressure (or force) is applied, an initial value (a dotted line) before releasing the display apparatus may represent that a sampling reference value BL of the ADC 622 is 1.14 V and a voltage value a of the sampled sensing data of the sensing signal is 0.11 V. Also, when a measurement value (a solid line) under an environment noise effect of the display apparatus is based on a sampling reference value BL, a voltage value b of the sampled sensing data of the sensing signal may be 0.13 V. In this case, the measurement value (the solid line) under the environment noise effect may cause an error value c of 0.02 V.

According to an aspect of the present disclosure, the sensing controller 621 may change a sampling reference value BL of the ADC 622 to an updated sampling reference value BL', based on a time at which the sensing start signal is applied from the sensor monitoring part 610. The updated sampling reference value BL' may be 1.16 V. Accordingly, in the measurement value (the solid line) under the environment noise effect of the display apparatus, a voltage value d of the sampled sensing data of the sensing signal may be 0.11 V, and an error value C may be compensated for. Accordingly, the sensor driving circuit 600 according to an aspect of the present disclosure may decrease a sensor error caused by environment noise. As an example, the above-mentioned values of voltages are only illustrated or described for convenience, and thereby could be variously changed.

Figure 9:
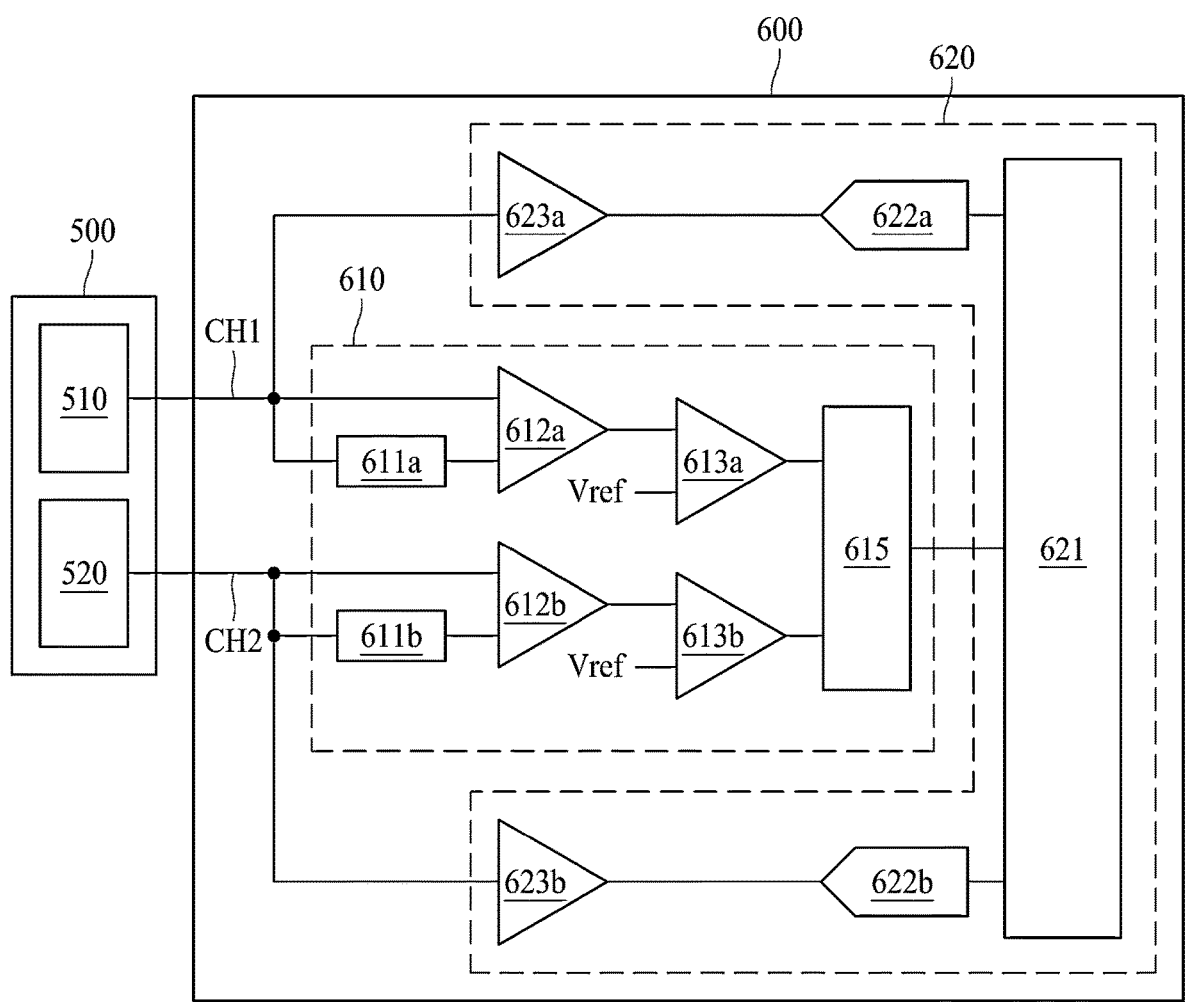
FIG. 9 illustrates a sensor driving circuit according to another aspect of the present disclosure.
Figure 10A:
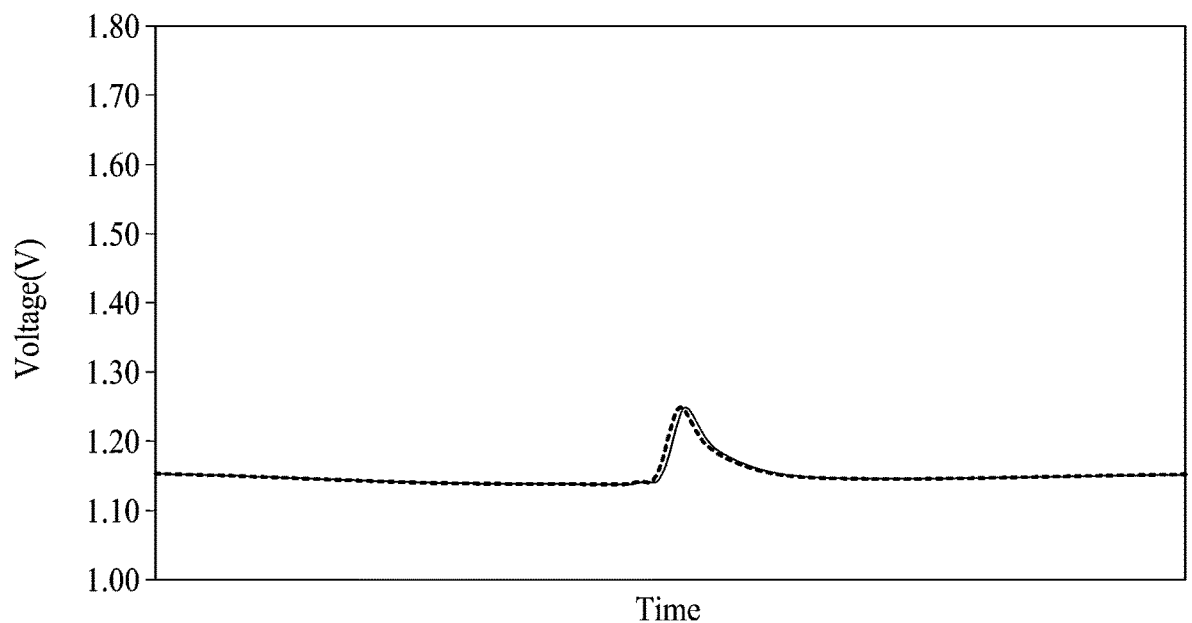
FIGS. 10A and 10B illustrate a sensing signal applied to the sensor driving circuit illustrated in FIG. 9 according to another aspect of the present disclosure.
Figure 10B:
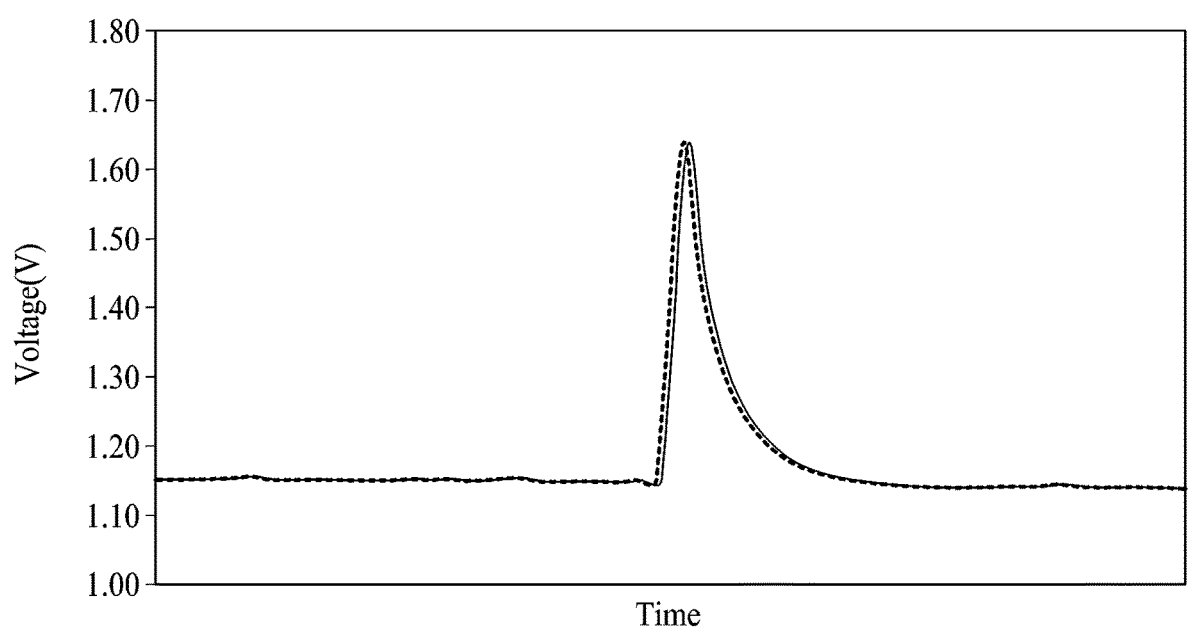
Figure 11A:
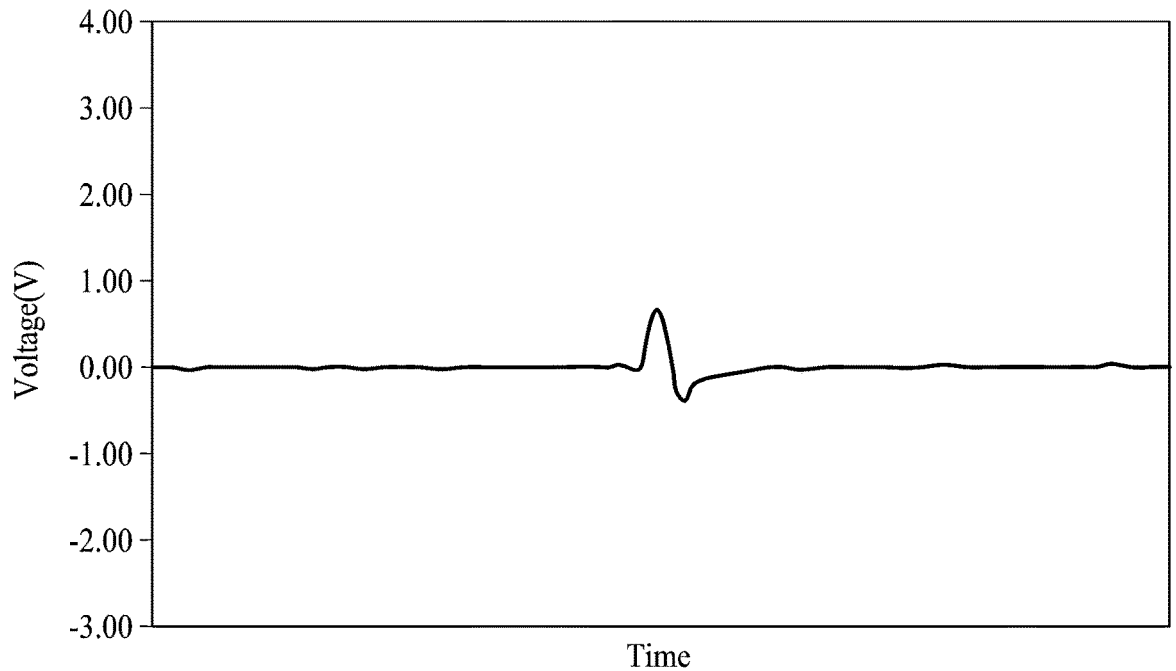
FIGS. 11A and 11B illustrate the amount of variation of a sensing signal output from the sensor driving circuit illustrated in FIG. 9 according to another aspect of the present disclosure.
Figure 11B:
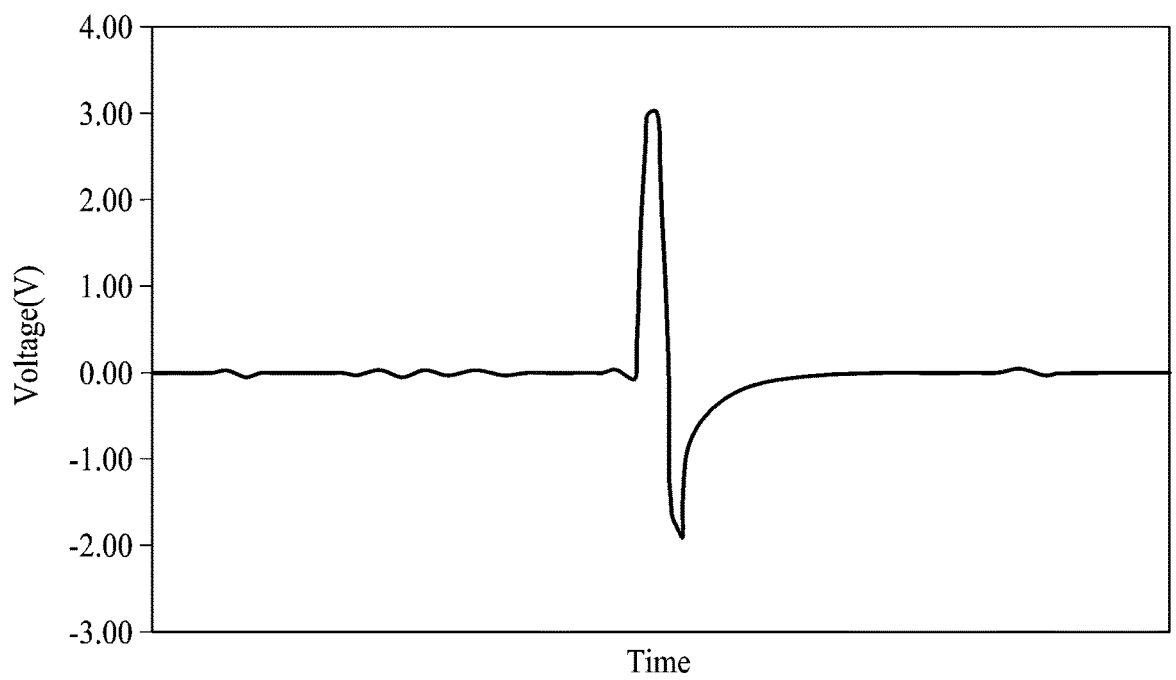
Figure 12:
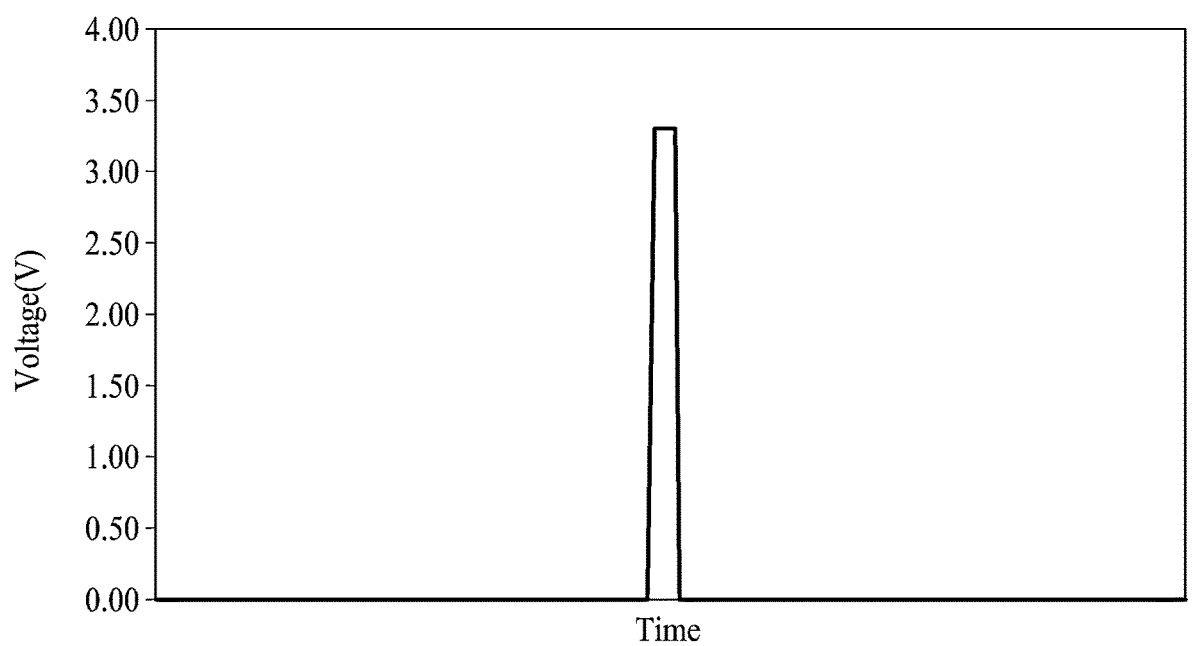
FIG. 12 illustrates a sensing start signal output from the sensor driving circuit illustrated in FIG. 9 according to another aspect of the present disclosure.

FIG. 9 illustrates a sensor driving circuit according to another aspect of the present disclosure. FIGS. 10A and 10B illustrate a sensing signal applied to the sensor driving circuit illustrated in FIG. 9 according to another aspect of the present disclosure. FIGS. 11A and 11B illustrate the amount of variation of a sensing signal output from the sensor driving circuit illustrated in FIG. 9 according to another aspect of the present disclosure. FIG. 12 illustrates a sensing start signal output from the sensor driving circuit illustrated in FIG. 9 according to another aspect of the present disclosure.

Referring to FIGS. 9 to 12, a sensor driving circuit 600 according to another aspect of the present disclosure may include a sensor monitoring part 610 and a sensing part 620, which are connected with a plurality of sensing channels CH1 and CH2 respectively connected with a plurality of sensors 510 and 520, but aspects of the present disclosure are not limited thereto.

The sensor monitoring part 610 may be connected with a first sensing channel CH1 including a first sensor 510 and a second sensing channel CH2 including a second sensor 520. The sensor monitoring part 610 may receive a sensing signal of the first sensor 510 through the first sensing channel CH1. Also, the sensor monitoring part 610 may receive a sensing signal of the second sensor 520 through the second sensing channel CH2. The sensor monitoring part 610 may generate the sensing start signal, based on the sensing signal of the first sensor 510 and the sensing signal of the second sensor 520. For example, the sensing start signal may be a trigger signal which allows the sensing part 620 to start a sampling operation on each of or at least one of the sensing signal of the first sensor 510 and the sensing signal of the second sensor 520.

The sensing part 620 may sample the sensing signal of the first sensor 510 and the sensing signal of the second sensor 520 to obtain sensing data, based on the sensing start signal. For example, the sensing part 620 may sense a touch or pressure (or force) of a user by the sensing data.

The sensor monitoring part 610 may include one or more signal delay filters 611*a* and 611*b*, one or more first amplifiers 612*a* and 612*b*, one or more second amplifiers 613*a* and 613*b*, and a logic circuit 615, but aspects of the present disclosure are not limited thereto.

The one or more signal delay filters 611*a* and 611*b* may be configured to be respectively connected with the first sensing channel CH1 and the second sensing channel CH2. The one or more signal delay filters 611*a* and 611*b* may include a first signal delay filter 611*a* connected with the first sensing channel CH1 and a second signal delay filter 611*b* connected with the second sensing channel CH2. But aspects of the present disclosure are not limited thereto.

The first signal delay filter 611*a* may receive the sensing signal of the first sensor 510 through the first sensing channel CH1 connected with the first sensor 510. The first signal delay filter 611*a* may output a delay signal corresponding to the sensing signal of the first sensor 510. For example, the first signal delay filter 611*a* may delay an output of the sensing signal received from the first sensor 510, or may delay a phase of the sensing signal.

The second signal delay filter 611*b* may receive the sensing signal of the second sensor 520 through the second sensing channel CH2 connected with the second sensor 520. The second signal delay filter 611*b* may output a delay signal corresponding to the sensing signal of the second sensor 520. For example, the second signal delay filter 611*b* may delay an output of the sensing signal received from the second sensor 520, or may delay a phase of the sensing signal. As an example, the delayed time or phase for the first signal delay filter 611*a* and the second signal delay filter 611*b* may be the same or different from each other.

The one or more first amplifiers 612*a* and 612*b* may be configured to be respectively connected with the first and second sensing channels CH1 and CH2 and the first and second signal delay filters 611*a* and 611*b*. Each of the one or more first amplifiers 612*a* and 612*b* may include a first terminal, a second terminal, and an output terminal. For example, the first terminal may be a noninverting terminal, and the second terminal may be an inverting terminal. The one or more first amplifiers 612*a* and 612*b* may include a first-1 amplifier 612*a* and a first-2 amplifier 612*b*.

The first sensing channel CH1 may be connected with a first terminal of the first-1 amplifier 612*a*. The first signal delay filter 611*a* may be connected with a second terminal of the first-1 amplifier 612*a*. The first-1 amplifier 612*a* may output, through the output terminal, the amount of variation or momentary variation of a sensing signal generated by the first sensor 510, based on a first sensing signal of the first sensor 510 directly applied through the first sensing channel CH1 and a second sensing signal received prior to the first sensing signal via the first signal delay filter 611*a*.

The second sensing channel CH2 may be connected with a first terminal of the first-2 amplifier 612*b*. The second signal delay filter 611*b* may be connected with a second terminal of the first-2 amplifier 612*b*. The first-2 amplifier 612*b* may output, through the output terminal, the amount of variation or momentary variation of a sensing signal generated by the second sensor 520, based on a first sensing signal of the second sensor 520 directly applied through the second sensing channel CH2 and a second sensing signal received prior to the first sensing signal via the second signal delay filter 611*b*.

The one or more second amplifiers 613*a* and 613*b* may be configured to be connected with the one or more first amplifiers 612*a* and 612*b*, respectively and a reference voltage Vref. Each of the one or more second amplifiers 613*a* and 613*b* may include a first terminal, a second terminal, and an output terminal. For example, the first terminal may be a noninverting terminal, and the second terminal may be a reference voltage input terminal. The one or more second amplifiers 613a and 613b may include a second-1 amplifier 613a and a second-2 amplifier 613b.

An output terminal of the first-1 amplifier 612a may be connected with a first terminal of the second-1 amplifier 613a. The reference voltage Vref may be connected with the second terminal of the second-1 amplifier 613a. The second-1 amplifier 613a may compare the reference voltage Vref with the amount of variation or momentary variation of the sensing signal output from the first-1 amplifier 612a and may output a voltage signal, which is greater than the reference voltage Vref, through the output terminal.

An output terminal of the first-2 amplifier 612b may be connected with a first terminal of the second-2 amplifier 613b. The reference voltage Vref may be connected with the second terminal of the second-2 amplifier 613b. The second-2 amplifier 613b may compare the reference voltage Vref with the amount of variation or momentary variation of the sensing signal output from the first-2 amplifier 612b and may output a voltage signal, which is greater than the reference voltage Vref, through the output terminal. Although it is illustrated that the same or substantially the same reference voltage Vref is supplied to the second-1 amplifier 613a and the second-2 amplifier 613b, aspects are not limited thereto. As an example, different reference voltages may be supplied to the second-1 amplifier 613a and the second-2 amplifier 613b.

The logic circuit 615 may be connected with the second-1 amplifier 613a and the second-2 amplifier 613b. The logic circuit 615 may generate an output signal, based on at least one of the second-1 amplifier 613a and the second-2 amplifier 613b. For example, the logic circuit 615 may be an OR gate logic circuit. The logic circuit 615 may output an output of each of the second-1 amplifier 613a and the second-2 amplifier 613b as a result value of an OR gate. For example, when a voltage signal which is greater than the reference voltage Vref is output from at least one of the second-1 amplifier 613a and the second-2 amplifier 613b, the logic circuit 615 may output the sensing start signal. When a voltage signal which is less than the reference voltage Vref is output from all of the second-1 amplifier 613a and the second-2 amplifier 613b, the logic circuit 615 may not generate the sensing start signal.

As illustrated in FIGS. 10A and 10B, when a touch or pressure (or force) of a user is applied to one of a first region where the first sensor 510 is disposed and a second region where the second sensor 520 is disposed, a sensing signal where a voltage value varies may be applied from at least one of the first sensing channel CH1 and the second sensing channel CH2. For example, FIG. 10A represents a sensing signal of the first sensing channel CH1, and FIG. 10B represents a sensing signal of the second sensing channel CH2. For example, a touch or pressure (or force) of a user may be applied to the second sensor 520 connected with the second sensing channel CH2. Therefore, the second sensing channel CH2 may output a sensing signal in which the touch or pressure (or force) of the user is directly reflected, and the first sensing channel CH1 may output a sensing signal in which the touch or pressure (or force) of the user is indirectly or even not reflected.

Referring to FIG. 10A, the first-1 amplifier 612a may receive a first sensing signal (a solid line) and a second sensing signal (a dotted line) of the first sensor 510. For example, the first sensing signal (the solid line) of the first sensor 510 may be a real time signal which is directly received through the first sensing channel CH1, and the second sensing signal (the dotted line) of the first sensor 510 may be a delay signal which is received prior to the first sensing signal via the first signal delay filter 611a. For example, each of the first sensing signal (the solid line) and the second sensing signal (the dotted line) may be a voltage signal which increases based on a touch or pressure (or force) of a user, without being limited thereto. As an example, each of the first sensing signal (the solid line) and the second sensing signal (the dotted line) may be a voltage signal which decreases based on a touch or pressure (or force) of a user. For example, when the touch or pressure (or force) of the user is not sensed, the first sensing signal (the solid line) and the second sensing signal (the dotted line) may maintain a certain voltage value of, for example, about 1.15 V. When the touch or pressure (or force) of the user is indirectly sensed, the first sensing signal (the solid line) and the second sensing signal (the dotted line) may increase to, for example, about 1.25 V. However, aspects of the present disclosure are not limited thereto.

Referring to FIG. 10B, the first-2 amplifier 612b may receive a first sensing signal (a solid line) and a second sensing signal (a dotted line) of the second sensor 520. For example, the first sensing signal (the solid line) of the second sensor 520 may be a real time signal which is directly received through the second sensing channel CH2, and the second sensing signal (the dotted line) of the second sensor 520 may be a delay signal which is received prior to the first sensing signal via the second signal delay filter 611b. For example, each of the first sensing signal (the solid line) and the second sensing signal (the dotted line) may be a voltage signal which increases based on a touch or pressure (or force) of a user. For example, when the touch or pressure (or force) of the user is not sensed, the first sensing signal (the solid line) and the second sensing signal (the dotted line) may maintain a certain voltage value of, for example, about 1.15 V. When the touch or pressure (or force) of the user is directly sensed, the first sensing signal (the solid line) and the second sensing signal (the dotted line) may increase to, for example, about 1.65 V. However, aspects of the present disclosure are not limited thereto.

As illustrated in FIGS. 11A and 11B, each of the first-1 amplifier 612a and the first-2 amplifier 612b may output the amount of variation or momentary variation determined based on comparison the first sensing signal and the second sensing signal. Each of the first-1 amplifier 612a and the first-2 amplifier 612b may be a subtraction amplifier which subtracts the second sensing signal from the first sensing signal to output an amplified signal, without being limited thereto. When a touch or pressure (or force) of a user is not sensed, the amount of variation or momentary variation of the sensing signal output from each of the first-1 amplifier 612a and the first-2 amplifier 612b may maintain a certain voltage value of, for example, about 0 V.

When the touch or pressure (or force) of the user is sensed, the amount of variation or momentary variation of the sensing signal output from each of the first-1 amplifier 612a and the first-2 amplifier 612b may have a signal width equal to a time for which the second sensing signal is delayed from the first sensing signal, a voltage value increasing up to, for example, 0.60 V may be output from the first-1 amplifier 612a and a voltage value increasing up to, for example, 3.00 V may be output from the first-2 amplifier 612b. However, aspects of the present disclosure are not limited thereto.

As illustrated in FIG. 12, when the amount of variation or momentary variation of a sensing signal output from each of or at least one of the first-1 amplifier 612a and the first-w amplifier 612b is greater than a threshold value defined by the reference voltage Vref, the second-1 amplifier 613a and/or the second-2 amplifier 613b, and the logic circuit 615 may output a voltage pulse signal having a first voltage level (e.g., a high level).

Each of the second-1 amplifier 613a and the second-2 amplifier 613b may be an OR gate logic circuit which compares the reference voltage Vref with a voltage signal output from respective one of the first-1 amplifier 612a and the first-w amplifier 612b to output an amplified signal, and the logic circuit 615 may be an OR gate logic circuit which compares a voltage signal output from the second-1 amplifier 613a and a voltage signal output from the second-2 amplifier 613b. For example, when the reference voltage Vref is adjust to 0.25 V and the voltage signal output from at least one of the first-1 amplifier 612a and the first-2 amplifier 612b is greater than 0.25 V, a voltage value output from the second-1 amplifier 613a and/or the second-2 amplifier 613b, and the logic circuit 615 may be adjusted to, for example, 3.3 V, but aspects of the present disclosure are not limited thereto. The voltage signal output from the logic circuit 615 may be transferred to the sensing part 620. For example, the voltage signal output from the logic circuit 615 may be a sensing start signal which triggers a sampling operation of the sensing part 620.

Although it is illustrated that there are only two sensors 500 in the display member 100, aspects are not limited thereto. As an example, the display member 100 may include more than two sensors 500 disposed at different areas of the display member 100, and each of the more than two sensors 500 may be connected to respective sensor monitoring unit 610, and may be commonly connected to a logic circuit 615 and/or a sensing unit 620, without being limited thereto.

A sensor driving circuit and a display apparatus including the same according to various aspects of the present disclosure will be described below.

A sensor driving circuit according to various aspects of the present disclosure may include a sensing channel connected with at least one sensor, a sensor monitoring part configured to receive a sensing signal from the sensing channel and generate a sensing start signal based on the sensing signal, and a sensing part sampling the sensing signal to obtain a sensing data based on the sensing start signal.

According to various aspects of the present disclosure, the sensing signal may be a voltage signal.

According to various aspects of the present disclosure, the sensor monitoring part may be configured to generate the sensing start signal, based on an amount of variation of the sensing signal.

According to various aspects of the present disclosure, the sensor monitoring part may be configured to monitor the amount of variation of the sensing signal, based on a first sensing signal and a second sensing signal which differs in receiving time from the first sensing signal, and when the amount of variation of the sensing signal is greater than or equal to a threshold value, the sensor monitoring part may be configured to generate the sensing start signal.

According to various aspects of the present disclosure, the amount of variation of the sensing signal may be determined by comparison of the first sensing signal and the second sensing signal.

According to various aspects of the present disclosure, the second sensing signal may be a delay signal which is received prior to the first sensing signal.

According to various exemplary aspects of the present disclosure, the first sensing signal may be received in real time.

According to various exemplary aspects of the present disclosure, the amount of variation of the sensing signal may have a signal width equal to a time for which the second sensing signal is delayed from the first sensing signal.

According to various aspects of the present disclosure, the sensor monitoring part may include a signal delay filter connected with the sensing channel, a first amplifier connected with the sensing channel and the signal delay filter, and a second amplifier connected with the first amplifier and a reference voltage.

According to various aspects of the present disclosure, the first amplifier may be a subtraction amplifier, and the second amplifier may be a comparison amplifier.

According to various aspects of the present disclosure, the first amplifier may output the amount of variation of the sensing signal based on the first sensing signal applied from the sensing channel and the second sensing signal applied from the signal delay filter.

According to various aspects of the present disclosure, the second amplifier may output the sensing start signal, based on an output signal of the first amplifier which is greater than the reference voltage.

According to various aspects of the present disclosure, the sensing part may include an analog-to-digital converter connected with the sensing channel, and a sensing controller configured to control an operation of the analog-to-digital converter based on the sensing start signal.

According to various aspects of the present disclosure, the sensing controller may start or stop the operation of the analog-to-digital converter, based on the sensing start signal.

According to various aspects of the present disclosure, the sensor driving circuit may further include a signal amplifier between the sensing channel and the analog-to-digital converter.

According to various aspects of the present disclosure, the sensor driving circuit may further include a plurality of sensing channels including the at least one sensor. Each of the plurality of sensing channels may be connected with the sensor monitoring part.

According to various aspects of the present disclosure, the sensor monitoring part may include one or more signal delay filters respectively connected with the plurality of sensing channels, one or more first amplifiers respectively connected with the plurality of sensing channels and respectively connected with the one or more signal delay filters, one or more second amplifiers respectively connected with the one or more first amplifiers and commonly connected with a reference voltage, and a logic circuit commonly connected with the one or more second amplifiers.

According to various aspects of the present disclosure, the logic circuit may include an OR gate.

According to various exemplary aspects of the present disclosure, when a voltage signal greater than the reference voltage is output from at least one of the one or more second amplifiers, the logic circuit may output the sensing start signal. When a voltage signal less than the reference voltage is output from all of the one or more second amplifiers, the logic circuit does not generate the sensing start signal.

According to various aspects of the present disclosure, the one or more sensors may include a force sensor.

According to various aspects of the present disclosure, the force sensor may be configured as at least one of a piezoelectric type, a force sensing resistor type, or a strain gauge type.

A display apparatus according to various aspects of the present disclosure may include a display panel configured to display an image, and a force sensor part configured to sense a pressure of the display panel. The force sensor part may include a sensing channel connected with at least one sensor, a sensor monitoring part receiving a sensing signal from the sensing channel and generating a sensing start signal, based on the sensing signal, and a sensing part sampling the sensing signal to obtain sensing data, based on the sensing start signal.

According to various exemplary aspects of the present disclosure, a rear surface of the display panel may include a plurality of regions, and a plurality of the sensors may be disposed in the plurality of regions, respectively.

A sensor driving circuit according to an aspect of the present disclosure may be applied to or included in a sensor driving circuit provided in the display apparatus. The display apparatus according to an aspect of the present disclosure may be applied to or included in mobile apparatuses, video phones, smart watches, watch phones, wearable apparatuses, foldable apparatuses, rollable apparatuses, bendable apparatuses, flexible apparatuses, curved apparatuses, sliding apparatus, variable apparatus, electronic organizers, electronic book, portable multimedia players (PMPs), personal digital assistants (PDAs), MP3 players, mobile medical apparatuses, desktop personal computers (PCs), laptop PCs, netbook computers, workstations, navigation apparatuses, automotive navigation apparatuses, automotive display apparatuses, automotive apparatuses, theatre apparatuses, theatre display apparatuses, televisions (TVs), wall paper display apparatuses, signage apparatuses, game machines, notebook computers, monitors, cameras, camcorders, home appliances, etc.

It will be apparent to those skilled in the art that various modifications and variations can be made in the sensor driving circuit and the display apparatus including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A sensor driving circuit, comprising:
   a sensing channel connected with at least one sensor;
   a sensor monitoring part configured to receive a sensing signal from the sensing channel and generate a sensing start signal based on the sensing signal; and
   a sensing part sampling the sensing signal to obtain a sensing data based on the sensing start signal,
   wherein the sensor monitoring part is configured to generate the sensing start signal based on an amount of variation of the sensing signal,
   wherein the sensor monitoring part is configured to monitor the amount of variation of the sensing signal based on a first sensing signal and a second sensing signal which differs in receiving time from the first sensing signal, and when the amount of variation of the sensing signal is greater than or equal to a threshold value, the sensor monitoring part is configured to generate the sensing start signal, and
   wherein the sensor monitoring part comprises:
      a signal delay filter connected with the sensing channel;
      a first amplifier connected with the sensing channel and the signal delay filter; and
      a second amplifier connected with the first amplifier and a reference voltage.

2. The sensor driving circuit of claim 1, wherein the sensing signal is a voltage signal.

3. The sensor driving circuit of claim 1, wherein the amount of variation of the sensing signal is determined by comparison of the first sensing signal and the second sensing signal.

4. The sensor driving circuit of claim 1, wherein the second sensing signal is a delay signal which is received prior to the first sensing signal.

5. The sensor driving circuit of claim 4, wherein the first sensing signal is received in real time.

6. The sensor driving circuit of claim 5, wherein the amount of variation of the sensing signal has a signal width equal to a time for which the second sensing signal is delayed from the first sensing signal.

7. The sensor driving circuit of claim 1, wherein the first amplifier is a subtraction amplifier, and the second amplifier is a comparison amplifier.

8. The sensor driving circuit of claim 1, wherein the first amplifier outputs the amount of variation of the sensing signal based on the first sensing signal applied from the sensing channel and the second sensing signal applied from the signal delay filter.

9. The sensor driving circuit of claim 1, wherein the second amplifier outputs the sensing start signal based on an output signal of the first amplifier which is greater than the reference voltage.

10. The sensor driving circuit of claim 1, wherein the sensing part comprises:
    an analog-to-digital converter connected with the sensing channel; and
    a sensing controller configured to control an operation of the analog-to-digital converter based on the sensing start signal.

11. The sensor driving circuit of claim 10, wherein the sensing controller starts or stops the operation of the analog-to-digital converter based on the sensing start signal.

12. The sensor driving circuit of claim 10, further comprising a signal amplifier between the sensing channel and the analog-to-digital converter.

13. The sensor driving circuit of claim 1, further comprising a plurality of sensing channels including the at least one sensor,
    wherein each of the plurality of sensing channels is connected with the sensor monitoring part.

14. The sensor driving circuit of claim 13, wherein the sensor monitoring part comprises:
    one or more signal delay filters respectively connected with the plurality of sensing channels;
    one or more first amplifiers respectively connected with the plurality of sensing channels and respectively connected with the one or more signal delay filters;
    one or more second amplifiers respectively connected with the one or more first amplifiers and commonly connected with a reference voltage; and
    a logic circuit commonly connected with the one or more second amplifiers.

15. The sensor driving circuit of claim 14, wherein the logic circuit comprises an OR gate.

16. The sensor driving circuit of claim 14, wherein when a voltage signal greater than the reference voltage is output from at least one of the one or more second amplifiers, the logic circuit outputs the sensing start signal, and
    when a voltage signal less than the reference voltage is output from all of the one or more second amplifiers, the logic circuit does not generate the sensing start signal.

17. The sensor driving circuit of claim 1, wherein the at least one sensor comprises a force sensor.

18. The sensor driving circuit of claim 17, wherein the force sensor is configured as at least one of a piezoelectric type, a force sensing resistor type, or a strain gauge type.

19. The sensor driving circuit of claim 1, wherein the sensing part starts sampling the sensing signal in synchronization with the sensing start signal, and stops sampling the sensing signal when a certain time elapses from a time at which the sensing start signal is applied.

20. A display apparatus, comprising:
a display panel configured to display an image; and
a force sensor part configured to sense a pressure of the display panel,
wherein the force sensor part comprises a sensor driving circuit,
wherein the sensor driving circuit comprises:
a sensing channel connected with at least one sensor;
a sensor monitoring part configured to receive a sensing signal from the sensing channel and generate a sensing start signal based on the sensing signal; and
a sensing part sampling the sensing signal to obtain a sensing data based on the sensing start signal,
wherein the sensor monitoring part is configured to generate the sensing start signal based on an amount of variation of the sensing signal,
wherein the sensor monitoring part is configured to monitor the amount of variation of the sensing signal based on a first sensing signal and a second sensing signal which differs in receiving time from the first sensing signal, and when the amount of variation of the sensing signal is greater than or equal to a threshold value, the sensor monitoring part is configured to generate the sensing start signal, and
wherein the sensor monitoring part comprises:
a signal delay filter connected with the sensing channel;
a first amplifier connected with the sensing channel and the signal delay filter; and
a second amplifier connected with the first amplifier and a reference voltage.

21. The display apparatus of claim 20, wherein a rear surface of the display panel includes a plurality of regions, and the at least one sensor is disposed in the plurality of regions, respectively.

* * * * *